United States Patent [19]

Peoples, Jr. et al.

[11] Patent Number: 4,529,639
[45] Date of Patent: Jul. 16, 1985

[54] MOLDED FOAM-BACKED CARPET ASSEMBLY AND METHOD OF PRODUCING SAME

[75] Inventors: Clarence A. Peoples, Jr., Rockwell, N.C.; Jacquelyn S. Hicks, Rock Hill, S.C.; Vernon C. Smith, Huntersville, N.C.

[73] Assignee: Collins & Aikman Corporation, New York, N.Y.

[21] Appl. No.: 625,224

[22] Filed: Jun. 27, 1984

[51] Int. Cl.³ .................. B29D 31/00; B32B 3/02; B32B 33/00
[52] U.S. Cl. .................. 428/95; 264/243; 264/257; 428/159; 428/160
[58] Field of Search .............. 264/45.1, 243, 257; 428/95, 159, 160

[56] References Cited

U.S. PATENT DOCUMENTS

| | | |
|---|---|---|
| 3,616,138 | 10/1971 | Wentworth ............... 428/95 |
| 4,016,318 | 4/1977 | DiGioia et al. ........... 428/95 |
| 4,078,100 | 3/1978 | Doerfling ................ 427/314 |
| 4,096,303 | 6/1978 | Doerfling ................ 428/91 |
| 4,186,230 | 1/1980 | Sinclair et al. .......... 428/95 |
| 4,199,634 | 4/1980 | Pole et al. .............. 428/95 |
| 4,230,755 | 10/1980 | Morris ................... 428/95 |
| 4,382,986 | 5/1983 | Reuben ................... 428/95 |

FOREIGN PATENT DOCUMENTS

| | | |
|---|---|---|
| 28715 | 5/1981 | European Pat. Off. |
| 2319431 | 10/1973 | Fed. Rep. of Germany. |
| 2063588 | 2/1974 | Fed. Rep. of Germany. |
| 2706446 | 3/1977 | Fed. Rep. of Germany. |
| 7836660 | 12/1978 | Fed. Rep. of Germany. |
| 2924197 | 12/1980 | Fed. Rep. of Germany. |
| 3034799 | 4/1982 | Fed. Rep. of Germany. |
| 7604210 | 9/1976 | France. |
| 7737745 | 7/1978 | France. |
| 59001230 | 1/1984 | Japan. |
| 2138012 | 10/1984 | |

Primary Examiner—Marion E. McCamish
Attorney, Agent, or Firm—Bell, Seltzer, Park & Gibson

[57] ABSTRACT

A molded foam-backed carpet assembly is provided which is suitable for use in automobiles and which includes a carpet layer, a moldable thermoplastic polymer layer and one or more foam pads fusibly bonded to the thermoplastic polymer layer and extending over less than the entire surface of the thermoplastic polymer layer to provide desired cushioning and sound and thermal insulation only in preselected areas of the carpet where needed.

11 Claims, 7 Drawing Figures

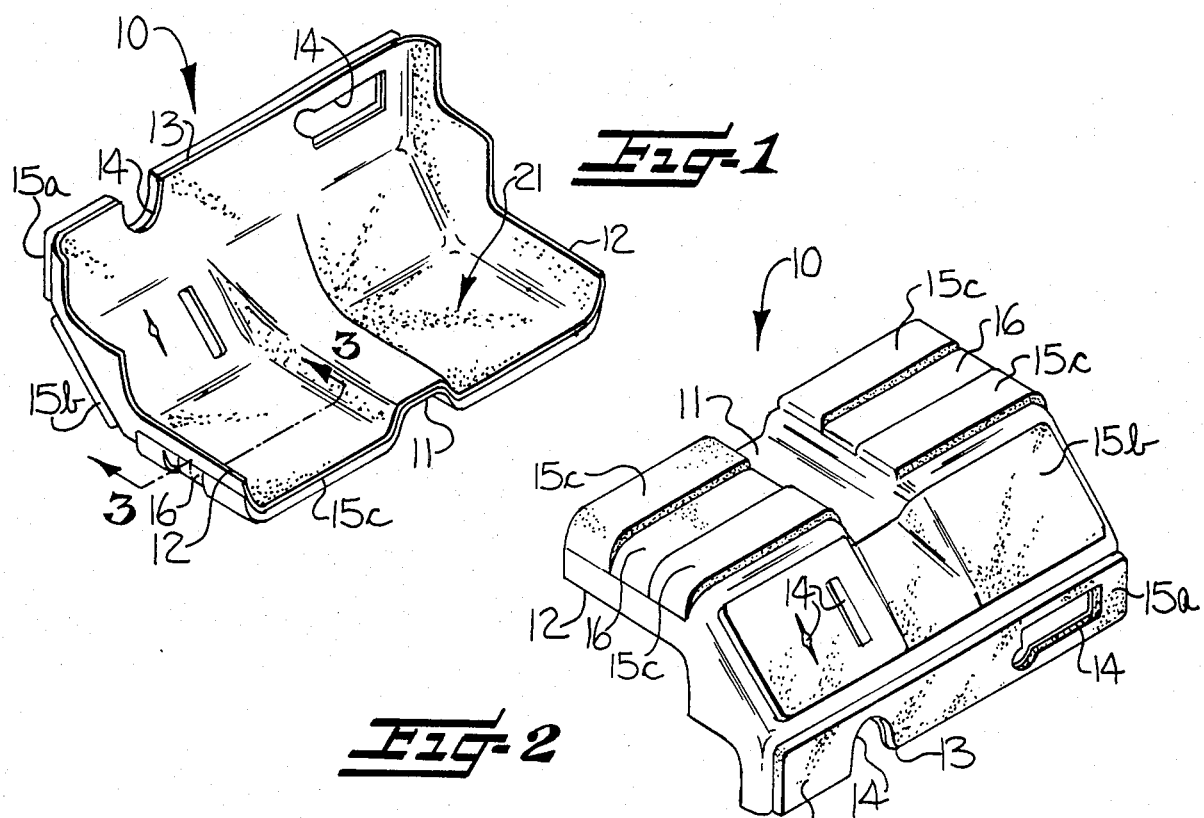
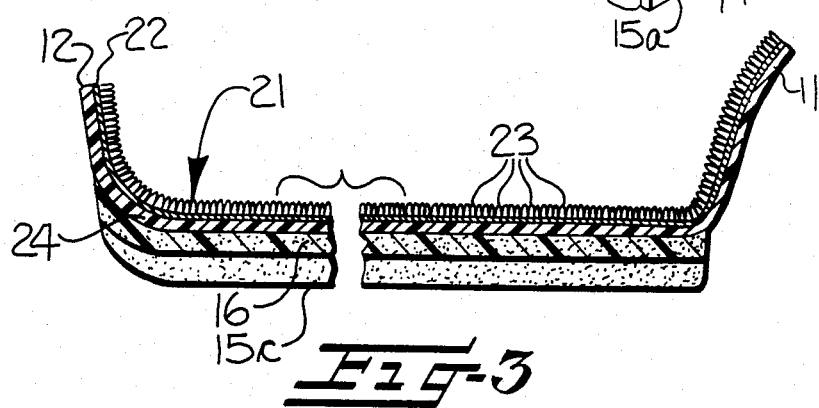
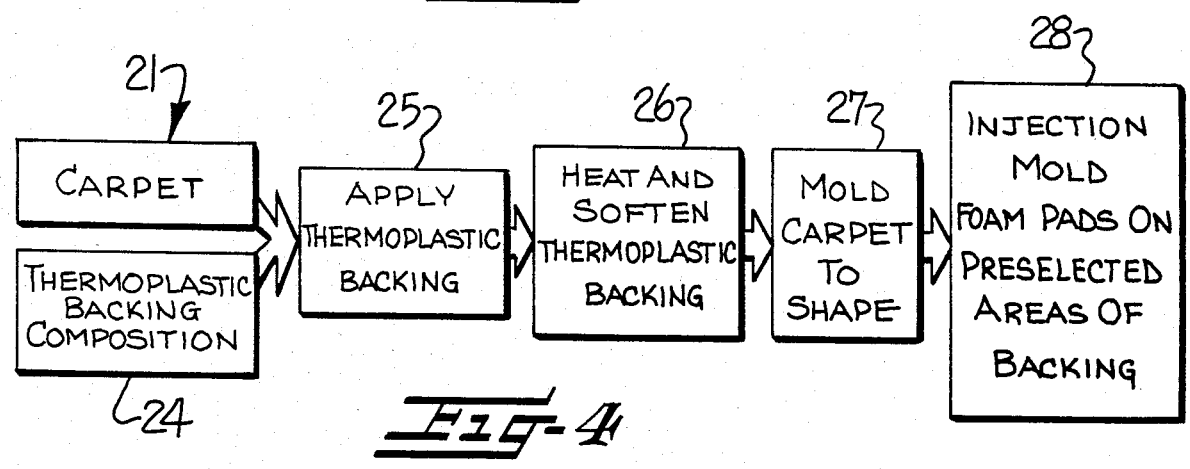

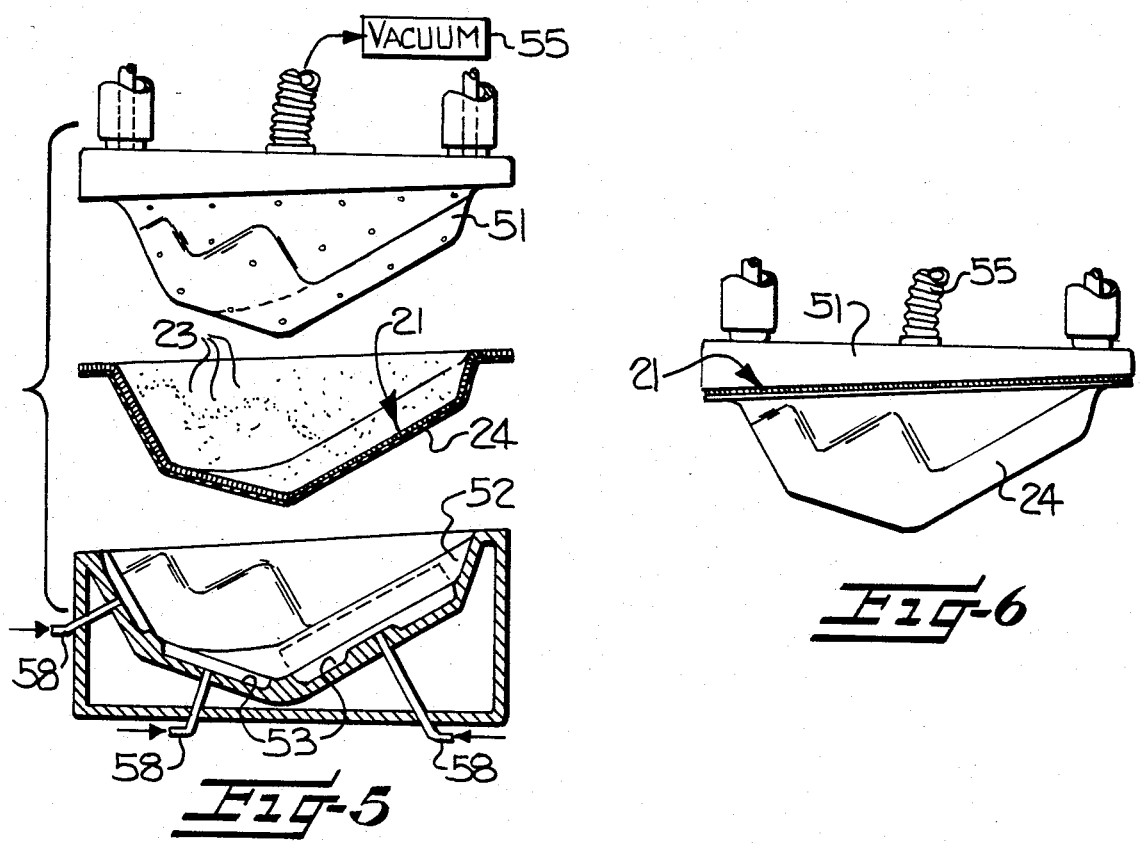
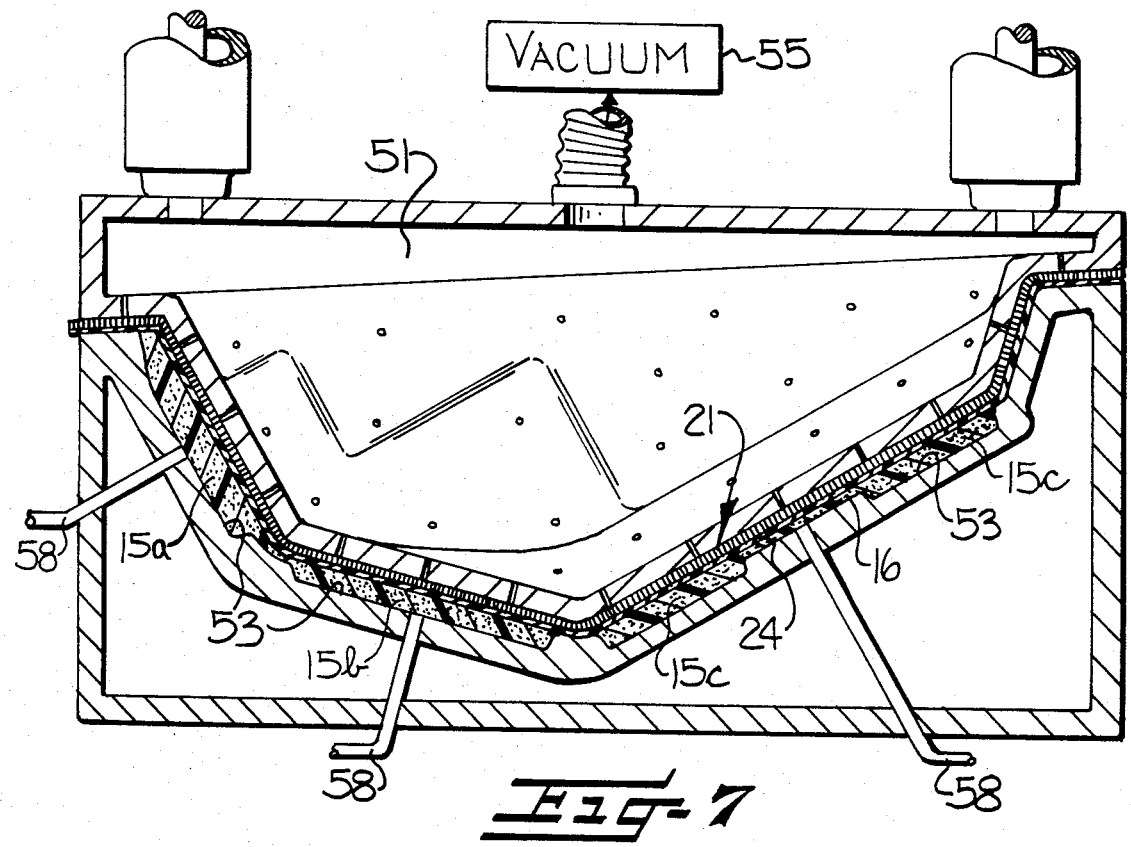

MOLDED FOAM-BACKED CARPET ASSEMBLY AND METHOD OF PRODUCING SAME

FIELD AND BACKGROUND OF THE INVENTION

This invention relates to a molded carpet assembly suitable for use for example in automobiles, and to the method of producing such a carpet assembly.

The carpeting used to cover the floor areas of automobiles is conventionally molded into a nonplanar three dimensional contoured configuration which conforms to the contours of the automobile floor so as to fit properly, for example, over the transmission hump on the floor of the automobile. In order to make the carpeting moldable and shape sustaining, it is conventionally provided with a backing or coating of a thermoplastic polymer composition. The thermoplastic polymer backing may contain substantial amounts of inorganic fillers to improve the sound deadening properties. Additionally, the automotive carpets are normally provided with padding on the rear surface for cushioning, sound deadening, and thermal insulation. The pads are commonly formed from relatively inexpensive fibers such as jute or recycled waste fibers, and they are precut into predetermined desired shapes and bonded to the back-coated surface of the molded carpet. Formerly, the padding was used over the entire rear surface of the carpet, as shown for example in Squier U.S. Pat. No. 3,673,034. More recently, in an effort to reduce weight and cost and to achieve better conformity to the irregular contours of the automobile interiors, the pads have been applied only in selected areas of the carpet where the cushioning, sound deadening and thermal insulation are most needed. Depending upon the particular automobile body style, the molded carpet may require one or several pads, often of varying thickness, at different locations on the back of the molded carpet.

In the production of this type of molded carpet assembly, a number of difficulties are encountered. The pads often vary in size and thickness, which results in nonuniformity of the resulting product. This construction requires manual placement and assembly of the pads which, in addition to the labor costs involved, often results in variations in placement of the pads on the carpet backing, which further contributes to a nonuniform product and results in a poor fit when the carpet assembly is later installed in the automobile. Difficulties are also encountered in obtaining good adherence between the fiber waste pads and the carpet backing. As a result, the pads may have a tendency to become detached during subsequent handling or installation.

It has also been proposed to employ a foam cushioning layer instead of fiber pads in moldable automobile carpet structures. Moldable composite carpet structures of this type are disclosed, for example, in U.S. Pat. Nos. 4,016,318; 4,078,100; 4,186,230; 4,230,755; and German OS No. 29 24 197. Typically, they contain both a foam layer and a moldable thermoplastic polymer layer on the back of the carpet. The presence of the foam layer makes molding of the carpet difficult, since the thermal insulating property of the foam interferes with the necessary heating and cooling of the moldable thermoplastic layer during the molding operation. Also, excessive heating may damage the foam layer. In these constructions, the foam pad extends over the entire rear surface of the carpet assembly, and no provision is made for providing the pads in selected areas only of the carpet or for variations in pad thickness, as is needed for many automotive body styles as noted earlier. The presence of the foam pad throughout the rear surface also restricts the shapes and contours which can be imparted to the carpet by molding.

With the foregoing in mind, it is an object of the present invention to overcome the disadvantages associated with the existing known methods of production of a molded automotive carpet assembly.

SUMMARY OF THE INVENTION

The present invention provides an improved molded carpet assembly with padding provided only in localized preselected areas where needed. The carpet assembly avoids the necessity of using precut fiber pads which must be properly placed and secured to the carpet backing, and instead provides foam pads which are formed in situ at the desired locations on the back of the molded carpet assembly.

The molded foam-backed automotive carpet assembly of the present invention comprises a carpet having a backing and pile yarns carried by the backing and extending from one face thereof to form a pile surface, said carpet having a nonplanar three dimensional contoured configuration adapted to conform to the contours of the automobile;

a moldable thermoplastic polymer layer covering the opposite face of the carpet backing and imparting moldability to the carpet for maintaining the carpet in this nonplanar three dimensional contoured configuration; and at least one foam pad carrried by the thermoplastic polymer layer and fusibly bonded thereto, this pad extending over less than the entire surface of the thermoplastic polymer layer and providing desired cushioning and sound and thermal insulation only in preselected areas of the carpet.

The foam pads may further be formed so that they vary in thickness in certain areas so as to further contribute to a good fit and conform to irregularities in the floor. In typical constructions, the carpet assembly may include a plurality of pads at different areas on the carpet assembly, and these pads may differ in thickness and/or density in accordance with the requirements of the particular automobile body style.

Broadly, the method of producing molded carpet assemblies in accordance with the present invention comprises providing a carpet having a backing and pile yarns carried by the backing and extending from one face thereof to form a pile surface; applying to the carpet backing a layer of a moldable thermoplastic polymer; heating the carpet to soften the thermoplastic layer and molding the carpet into a predetermined nonplanar three dimensional contoured configuration; and forming in situ on the exposed surface of the thermoplastic layer at least one foam pad bonded to the thermoplastic layer and covering selected areas only of the carpet and extending over less than the entire surface of the thermoplastic polymer coating.

BRIEF DESCRIPTION OF THE DRAWINGS

Further and more specific features and advantages of the invention will become apparent from the detailed description which follows, when taken in connection with the accompanying drawings, in which—

FIG. 1 is perspective view showing a molded carpet assembly in accordance with the present invention;

FIG. 2 is perspective view showing the underside thereof;

FIG. 3 is an enlarged cross sectional view of the carpet assembly taken substantially along the line 3—3 of FIG. 1;

FIG. 4 is a block schematic diagram illustrating the process for producing the molded carpet assembly in accordance with the present invention;

FIG. 5 is a somewhat schematic exploded side cross sectional view showing a mold assembly which may be used for forming foam pads in accordance with the invention;

FIG. 6 is a side view of the mold assembly of FIG. 5 in the closed position; and FIG. 7 is an enlarged side cross sectional view of the mold assembly of FIG. 6.

DETAILED DESCRIPTION OF THE INVENTION

While the present invention will be described more fully hereinafter with reference to the accompanying drawings, in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now specifically to FIG. 1, reference character 10 generally indicates an automotive carpet assembly in accordance with the invention. The carpet assembly 10 illustrated in FIG. 1 has a nonplanar three dimensional molded configuration adapted to fit in the front seat compartment of an automobile and includes a raised medial portion 11 adapted to conform to the transmission hump, generally vertically extending side portions 12 adapted to fit beneath the door opening, and a front portion 13 adapted to fit along the inclined floorboard and vertical firewall areas of the automobile. Various openings or cut-outs are provided, as indicated at 14, to receive air conditioning equipment, the steering column, pedals and the like. It is to be understood that the particular three dimensional configuration illustrated is merely for purposes of illustration, and the actual configuration may vary quite significantly from that shown depending on the automobile body style.

The underside of the carpet assembly 10 is shown in FIG. 2. As illustrated, foam pads 15a, 15b, 15c extend over selected portions of the carpet assembly. More specifically, it will be seen that the foam pads extend over less than the entire rear surface of the carpet assembly and that the foam pads differ in thickness, not only from one pad to another but also vary in thickness within a given pad. In the embodiment illustrated, it will be seen that pad 15a located in the vertically extending firewall area 13 is relatively thick to provide added thermal and sound insulation in this area. Pad 15b in the angular inclined footrest area is of intermediate thickness. The pads 15c in the horizontal floor area have a thickness which tapers in the side portions 12 so as to fit snugly beneath the door molding. Also the pads 15c are shown with a widthwise extending step thickness change in the form of a reduced thickness area indicated at 16, to conform to and receive a corresponding reinforcing rib on the automobile floorboard and provide a smooth finished surface to the installed carpet assembly.

FIG. 3 shows the carpet assembly in greater detail. As illustrated, it includes a carpet 21, which may suitably be of tufted, woven, knitted, or nonwoven construction in accordance with known methods of carpet manufacture. The carpet 21 more specifically includes a backing 22 and pile yarns 23 which are secured to the backing 22 and extend therefrom to form a pile surface on the front of the carpet. The backing 22 is typically of a woven or nonwoven construction, depending upon the particular type of carpet construction. The pile yarns may be of any suitable composition, typically polyester or nylon. In order to more securely adhere and lock the pile yarns 23 into the backing 22, the carpet may include a suitable binder coating (not shown), as is conventional in the manufacture of tufted carpets.

On the rear surface of the carpet backing 22 there is provided a coating or layer 24 of a thermoplastic polymer composition. The thermoplastic polymer layer 24 is adhered firmly to the backing 22 and extends substantially over the entire surface thereof. The thermoplastic polymer layer 24 serves several functions. A primary function is to impart stiffness and moldability to the carpet so that the carpet can be molded into a desired three dimensional contoured configuration conforming to the contours of the floor of the automobile, and to impart shape retentive characteristics to the molded carpet so that it will maintain this three dimensional configuration during subsequent assembly and installation in the automobile and throughout its useful life. Another important function of the thermoplastic layer 24 is to impart sound deadening properties so as to thereby make the interior of the automobile more quiet. To this end, the thermoplastic composition may contain substantial proportions of filler materials such as calcium carbonate, gypsum, barium sulfate, etc. The filler content may, for example, be as high as about 80% by weight. Various polymers or copolymers may be suitably employed as the thermoplastic polymer such as, for example, polymers or copolymers of ethylene with ethylenically unsaturated monomers; blends of such polymers and copolymers with other processing aids or adjuvants such as processing oils, plasticizers and the like; polyolefin polymers such as polyethylene or polypropylene; polyvinyl chloride; styrene-butadiene mixed polymers and mixtures of these materials with other thermoplastic polymers. Specific examples of filled thermoplastic compositions designed for use as a sound deadening backing layer on automotive carpets are disclosed in U.S. Pat. Nos. 4,191,798, 4,242,395, 4,379,190, and 4,403,007. The thermoplastic polymer layer 24 may be applied to the back of the carpet by suitable methods such as extrusion coating, calendering, or lamination, for example.

The foam pads 15a, 15b, 15c are bonded to the thermoplastic polymer layer 24 and provide desired cushioning properties, as well as thermal and sound insulation to the carpet assembly 10. The pads 15 are formed of a foam material, preferably a polyurethane foam. As explained more fully hereinafter, the polyurethane foam pads are formed in situ on preselected areas of the backing. This results in the pads being permanently and fusibly bonded to the thermoplastic foam layer without the necessity of additional adhesives. Optionally, the foam composition may be loaded with fillers, glass beads, fibers or the like in order to vary the weight and density properties of the foam for optimum acoustical and cushioning properties.

A preferred method of producing the molded carpet assembly 10 is illustrated schematically in FIG. 4. As shown, the thermoplastic backing composition is applied to the back of the carpet in a suitable manner, indicated at 25, such as by extrusion coating or calendering. The thus coated carpet is then subjected to a molding operation where it is molded into a desired predetermined configuration. Typically, the molding operation includes heating a piece of the thermoplastic backed carpet to a temperature sufficiently high to soften the thermoplastic backing layer, as indicated at 26, and then placing the heated carpet between a pair of cooperating mold dies and applying pressure to the heated carpet within the mold dies in order to form it into the desired three dimensional configuration, as indicated at 27. After the carpet has cooled sufficiently to retain its shape, the mold dies are opened and the molded carpet is removed from the molds.

The thus molded coated carpet is then subjected to a second molding operation, indicated at 28, in which foam pads are formed in situ on preselected areas of the thermoplastic polymer back coating.

Preferably, a mold is provided which has a three dimensional configuration generally similar to that of the first mold which was used to shape the carpet. However, this mold includes recessed areas or wells of a size and depth which correspond to the foam pads to be formed. The foamable polyurethane composition is placed or injected in the wells, and the mold dies are brought together to enclose the molded carpet while the foamable composition foams, expands, and hardens to form foam pads in situ on preselected areas of the backing.

As illustrated more specifically in FIGS. 5 to 7, the apparatus for carrying out the foam pad molding step includes a cooperating upper mold 51 and lower mold 52. The recessed areas or wells in the lower mold 52 are indicated at 53. The upper mold 51 is preferably provided with suction means 55 which serves to hold the molded carpet in place on the upper mold until the mold halves are closed. A suitable amount of the foamable composition may be manually placed in the wells 53 prior to closing the mold halves. Alternatively, and as illustrated, injector nozzles, as indicated at 58 may be provided in association with each of the wells 53 for injecting a measured amount of the foamable composition into the well. In this instance, the mold halves may be suitably closed prior to injection of the foamable composition.

The foamable composition expands to fill the wells 53 and hardens and cures to form resilient flexible foam pads of the desired shape and density fusibly bonded to the exposed thermoplastic backing layer. To facilitate release of the in-situ molded pads from the mold, the molds may be coated with a suitable mold release composition prior to introduction of the foamable composition. Alternatively, a thin film may be draped over the mold and utilized as a release layer, with the film becoming bonded to the in-situ formed pad.

By providing different foamable compositions in different wells or in different areas of the same well it is possible to vary the density, flexibility, and other properties of the foam pad. The particular formulation of the foamable composition may be selected by those skilled in the art depending upon the particular physical properties (e.g., stiffness, resilience, hardness, density, sound deadening properties) desired in the final product. Two part foamable polyurethane compositions have been suitably employed to form the form. For example, a suitable soft low density (3 to 5 pounds per cubic foot) polyurethane foam for use in this invention may be produced from a mixture of about 60 percent of a polyol and 30 percent isocyanate (preferably all MDI but suitably a MDI/TDI blend), with about 10 percent auxiliary chemicals such as fluorocarbons, water, catalysts, surfactants and filters.

That which is claimed is:

1. A molded foam-backed carpet assembly suitable for use in automobiles and characterized in that the foam backing thereon is present only in localized preselected areas of the carpet assembly to reduce weight, provide better fit and conformity while providing the desired padding, cushioning and sound deadening where most needed, said carpet assembly comprising
   a carpet having a backing and pile yarns carried by the backing and extending from one face thereof to form a pile surface, said carpet having a nonplanar three dimensional contoured configuration adapted to conform to the contours of the automobile;
   a moldable thermoplastic polymer layer covering the opposite face of said carpet backing and imparting moldability to the carpet for maintaining the carpet in said nonplanar three dimensional contoured configuration; and
   at least one foam pad carried by said thermoplastic polymer layer and bonded thereto, said at least one pad extending over less than the entire surface of said thermoplastic polymer layer and providing desired cushioning and sound and thermal insulation only in preselected areas of the carpet.

2. A carpet assembly according to claim 1 wherein said at least one foam pad varies in thickness at differing locations within said preselected areas.

3. A carpet assembly according to claim 2 wherein the variation in thickness of the foam pad includes a step thickness change.

4. A carpet assembly according to claim 1 including a plurality of said foam pads, and wherein at least one of the foam pads differs in thickness from the other foam pads.

5. A carpet assembly according to claim 1 including a plurality of said foam pads, and wherein at least one of the foam pads differs in density from the other foam pads.

6. A molded foam-backed carpet assembly suitable for use in automobiles and characterized in that the foam backing thereon is present only in localized preselected areas of the carpet assembly to reduce weight, provide better fit and conformity while providing the desired padding, cushioning and sound deadening where most needed, said carpet assembly comprising
   a carpet having a backing and pile yarns carried by the backing and extending from one face thereof to form a pile surface, said carpet having a nonplanar three dimensional contoured configuration adapted to conform to the contours of the floor of an automobile;
   a moldable layer of a thermoplastic polymer adhered to and covering the opposite face of said carpet backing, said thermoplastic polymer containing a filler material for imparting a high density and sound deadening properties to the layer, and said layer also serving to impart moldability to the carpet for maintaining the carpet in said nonplanar three dimensional contoured configuration; and at least one foam pad carried by said thermoplastic polymer coating and fusibly bonded thereto, said foam pad having a thickness which varies at different locations in the pad and which is substantially greater than the thickness of said thermoplastic polymer layer and said pad extending over less than the entire surface of said thermoplastic polymer coating and providing cushioning and sound and thermal insulation only in preselected desired areas of the carpet.

7. A method of producing a molded foam-backed carpet assembly suitable for use in automobiles comprising providing a carpet having a backing and pile yarns carrried by the backing and extending from one face thereof to form a pile surface;

applying to the carpet backing a layer of a moldable thermoplastic polymer;

heating the carpet to soften the thermoplastic layer and molding the carpet into a predetermined nonplanar three dimensional contoured configuration; and forming in situ on the exposed surface of the thermoplastic layer at least one foam pad bonded to the thermoplastic layer and covering selected areas only of the carpet and extending over less than the entire surface of the thermoplastic polymer coating.

8. A method according to claim 7 wherein the step of forming in situ at least one foam pad comprises depositing a foamable polymer composition in a confined space on the back of the molded carpet, said confined space having predetermined dimensions corresponding to the desired shape of the pad and allowing the composition to foam, expand and harden in said confined space to form a pad therein fusibly bonded to the thermoplastic layer.

9. A method according to claim 8 wherein the foamable polymer composition is a polyurethane.

10. A method of producing a foam-backed carpet assembly comprising applying to the back of a carpet a sound deadening shape sustaining moldable layer of a thermoplastic polymer;

heating the carpet to thereby soften the thermoplastic polymer layer;

placing the heated carpet within a mold and molding the carpet into a predetermined nonplanar three dimensional contoured configuration;

removing the molded three dimensional carpet from the mold and placing the molded carpet in a second mold having a three dimensional contour corresponding substantially to that of molded three dimensional carpet and including cavities in preselected areas;

introducing into the cavities a foamable polymer composition and foaming the polymer composition to thereby form in situ on the back of the molded carpet foam pads covering selected areas less than the entire surface of the thermoplastic polymer coating; and removing the thus formed foam-backed carpet assembly from the mold.

11. A method according to claim 10 including introducing into the cavities at least two different foamable polymer compositions to thereby produce foam pads of differing physical characteristics.

* * * * *